United States Patent
Ku et al.

(10) Patent No.: US 7,920,150 B2
(45) Date of Patent: Apr. 5, 2011

(54) IMAGE SCALING SYSTEM CAPABLE OF SAVING MEMORY

(75) Inventors: Chih-Cheng Ku, Hsinchu (TW);
Chun-Chi Chen, Taipei (TW);
Wen-Cheng Ho, Shigang Shiang (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 960 days.

(21) Appl. No.: 11/812,288

(22) Filed: Jun. 18, 2007

(65) Prior Publication Data
US 2008/0049045 A1 Feb. 28, 2008

(30) Foreign Application Priority Data
Jun. 20, 2006 (TW) ................ 95122004 A

(51) Int. Cl.
*G09G 5/00* (2006.01)
*G06K 9/32* (2006.01)

(52) U.S. Cl. .......................... 345/660; 382/298; 382/300

(58) Field of Classification Search ............ 345/660; 382/298, 300
See application file for complete search history.

(56) References Cited

U.S. PATENT DOCUMENTS

| 6,028,589 | A * | 2/2000 | Mehra et al. | 345/603 |
| 6,331,902 | B1 * | 12/2001 | Lin | 358/1.9 |
| 2003/0128896 | A1 * | 7/2003 | Nacman et al. | 382/300 |
| 2004/0201863 | A1 * | 10/2004 | Bailey et al. | 382/298 |

* cited by examiner

*Primary Examiner* — Chante Harrison
(74) *Attorney, Agent, or Firm* — Bacon & Thomas, PLLC

(57) ABSTRACT

An image scaling system includes a window memory, a longitudinal scaler, a buffer and a latitudinal scaler. The window memory temporarily stores partial data of N image lines. The longitudinal scaler performs a longitudinal scaling operation on the partial data of the N image lines to thereby produce partial data of a longitudinal image line. The latitudinal scaler performs a latitudinal scaling operation on the partial data of the longitudinal image line to thereby produce scaling-part data of a latitudinal image line. The longitudinal scaler and the latitudinal scaler use a window average to perform an image shrinking operation and a bi-linear interpolation average to perform an image expanding operation.

15 Claims, 8 Drawing Sheets

```
DoExpand
BEGIN
    INPUT in_size;
    INPUT out_size;
    INIT max_weight = 2^8;
    INIT expand_para = max_weight * in_size / out_size;
    INIT remain_weight = 0;
    INIT weight[2] = 0;
    INIT weight[3] = 0;
    INIT weight[4] = 0;
    INIT starting_pixel_pointer = 0;
    INIT interval = 0;

FOR each output_idx From 0 To out_size
        interval = 0;
        weight[0] = max_weight - remain_weight;
        weight[1] = remain_weight;

CALL ExecuteScalingHardware with starting_pixel_pointer, output_idx and weight[0...4];

remain_weight += expand_para;
        IF remain_weight > max_weight THEN
            remain_weight -= max_weight;
            INCREMENT interval;
        END IF
        starting_pixel_pointer += invterval;
    END FOR
END
ExecuteScalingHardware BEGIN
    INPUT starting_pixel_pointer;
    INPUT output_idx;
    INPUT weight[0...4];

Get 5 input_data From starting_pixel_pointer;
    output_data = (    weight[0] * input_data[0] +
            weight[1] * input_data[1] +
            weight[2] * input_data[2] +
            weight[3] * input_data[3] +
            weight[4] * input_data[4] ) >> 8;

END
```

FIG. 3

```
DoShrink
BEGIN
    INPUT in_size;
    INPUT out_size;
    INIT max_weight = 2^8;
    INIT shrink_norm = max_weight * out_size / in_size;
    INIT remain_weight = 0;
    INIT total_weight = 0;
    INIT interval = 0;
    INIT starting_pixel_pointer = 0;

FOR each output_idx From 0 to out_size
        total_weight = max_weight;
        interval = 0;
        IF remain_weight > 0 THEN
            weight[0] = remain_weight;
        ELSE
            weight[0] = shrink_norm;
        END IF
        total_weight -= weight[0];
        INCREMENT interval;

FOR each weight_idx From 1 to 4
            IF total_weight >= shrink_norm THEN
                weight[weight_idx] = shrink_norm;
                total_weight -= weight[weight_idx];
                INCREMENT interval;
            ELSE IF total_weight > 0 THEN
                weight[weight_idx] = total_weight;
                remain_weight = shrink_norm - weight[weight_idx];
                total_weight = 0;
            ELSE
                weight[weight_idx] = 0;
            END IF
        END FOR
        CALL ExecuteScalingHardware with starting_pixel_pointer, output_idx and weight[0...4];
        starting_pixel_pointer += interval;
    END FOR
END
ExecuteScalingHardware
BEGIN
    INPUT starting_pixel_pointer;
    INPUT output_idx;
    INPUT weight[0...4];

Get 5 input_data From starting_pixel_pointer;
    output_data = (    weight[0] * input_data[0] +
            weight[1] * input_data[1] +
            weight[2] * input_data[2] +
            weight[3] * input_data[3] +
            weight[4] * input_data[4] ) >> 8;
END
```

FIG. 4

$E1 = [P1 \times 256 + P2 \times 0 + P3 \times 0 + P4 \times 0 + P5 \times 0] >> 2^8$ $E2 = [P1 \times (256-121) + P2 \times (121) + P3 \times 0 + P4 \times 0 + P5 \times 0] >> 2^8$ $E3 = [P1 \times (256-121-121) + P2 \times (121+121) + P3 \times 0 + P4 \times 0 + P5 \times 0] >> 2^8$ $E4 = [P2 \times (256-107) + P3 \times (107) + P4 \times 0 + P5 \times 0 + P6 \times 0] >> 2^8$ $S1 = (P1 \times 98 + P2 \times 98 + P3 \times 60 + P4 \times 0 + P \times 0) >> 2^8$ $S2 = [P3 \times (98-60) + P4 \times 98 + P5 \times 98 + P6 \times 22] >> 2^8$

IMAGE SCALING SYSTEM CAPABLE OF SAVING MEMORY

BACKGROUND OF THE INVENTION

1. Field of the Invention

The invention relates to the technical field of image shrinkage and expansion and, more particularly, to an image scaling system capable of saving memory.

2. Description of Related Art

Interpolations are used popularly in typical 2D image expanding and shrinking techniques. Such interpolation methods require a scan line buffer. On a longitudinal image expansion, the data of an image line is read from a main memory, and each pixel of the image line read is multiplied by a respective scaling factor and stored in the scan line buffer. Next, the data of a next image line is read, and each pixel of the next image line read is multiplied by the respective scaling factor and accumulated on the respective pixels stored in the scan line buffer. The accumulated pixels are performed with a shift operation to thereby obtain a longitudinally expanded output image.

Another typical method replaces the scan line buffer with a static random access memory (SRAM) to temporarily store a number of lines of input image data. In this case, a logic circuit is used to read the pixel values stored in the SRAM, multiply the read pixel values by the respective scaling factors, and perform accumulating and shifting operations on the accumulated pixel values. Thus, the pixel values of an output image are obtained. Such a method can reduce the number that the data is read from the SRAM, but has to increase the size of the SRAM. Accordingly, when the width of an image is very large, the size of SRAM used is increased dramatically, and thus the hardware cost of the system is considerably increased.

U.S. Pat. No. 6,219,465 granted to Nacman et al. for a "High Quality Digital Scaling Using Pixel Window Average and Linear Interpolation" has disclosed a window average for an image shrinking operation and an interpolation for an image expanding operation. The hardware configuration in the U.S. Pat. No. 6,219,465 commonly uses a scan line buffer to temporarily store data, and changes a selective scaling factor to thereby obtain desired proportions of longitudinal or latitudinal expansion and shrinkage. However, because the data of an image line is stored in an SRAM, only 1D data can be processed in a parallel mode, and as the scan line buffer is used to temporarily store median operation data, the output data requires two 2D processing for producing an out image line. The disadvantage of such a method is in that the interval between the image lines may be too long since the output image uses an image line as a unit, which is not suitable for a system with a real-time output requirement. In addition, in a serial mode, two 2D data can be processed at one time to thereby fulfill the real-time output requirement, but this requires sharing a scan line buffer. In addition, due to the sequences and speeds of processing data, one of 2D processing systems may be idle to thus reduce the output performance of the systems. Accordingly, it is desired for the typical image scaling system to be improved.

SUMMARY OF THE INVENTION

An object of the invention is to provide an image scaling system capable of saving memory, which can save the required memory and reduce the hardware cost of the system.

Another object of the invention is to provide an image scaling system capable of saving memory, which can obtain the real-time image scaling operation so as to overcome the problem that the real-time image output cannot be achieved in the prior art.

In accordance with one aspect of the present invention, there is provided an image scaling system capable of saving memory, which is provided for shrinking and expanding an image consisting of plural image lines. The image scaling system includes a window memory, a longitudinal scaler, a buffer and a latitudinal scaler. The window memory receives and temporarily stores partial data of N image lines, where N is a positive integer. The longitudinal scaler is connected to the window memory in order to perform a longitudinal scaling operation on the partial data of the N image lines to thereby produce partial data of a longitudinal image line. The buffer is connected to the longitudinal scaler in order to receive and temporarily store the partial data of the longitudinal image line. The latitudinal scaler is connected to the buffer in order to perform a latitudinal scaling operation on the partial data of the longitudinal image line to thereby produce scaling-part data of a latitudinal image line. The longitudinal scaler and the latitudinal scaler use a window average to perform a shrinking operation for shrinking the image, and a bi-linear interpolation average to perform an expanding operation for expanding the image.

In accordance with another aspect of the present invention, there is provided an image scaling system capable of saving memory, which is provided for shrinking and expanding an image consisting of plural image lines. The image scaling system includes a window memory, a longitudinal scaler, a buffer, a latitudinal scaler and a controller. The window memory receives and temporarily stores partial data of N image lines, where N is a positive integer. The longitudinal scaler is connected to the window memory in order to perform a longitudinal scaling operation on the partial data of the N image lines to thereby produce partial data of a longitudinal image line. The buffer is connected to the longitudinal scaler in order to receive and temporarily store the partial data of the longitudinal image line. The latitudinal scaler is connected to the buffer in order to perform a latitudinal scaling operation on the partial data of the longitudinal image line to thereby produce scaling-part data of a latitudinal image line. The controller is connected to the longitudinal scaler and the latitudinal scaler in order to perform an initialization and associated settings on the longitudinal scaler and the latitudinal scaler, compute N longitudinal weights respectively for the N image lines, and write the N longitudinal weights to the longitudinal scaler. The longitudinal scaler and the latitudinal scaler use a window average to perform a shrinking operation for shrinking the image and a bi-linear interpolation average to perform an expanding operation for expanding the image.

Other objects, advantages, and novel features of the invention will become more apparent from the following detailed description when taken in conjunction with the accompanying drawings.

BRIEF DESCRIPTION OF THE DRAWINGS

FIG. 3 is a schematic diagram of pseudo codes for generating M latitudinal weights by a latitudinal weight generator on image expansion in accordance with the invention;

FIG. 4 is a schematic diagram of pseudo codes for generating M latitudinal weights by a latitudinal weight generator on image shrinkage in accordance with the invention;

DETAILED DESCRIPTION OF THE PREFERRED EMBODIMENT

Figure 1:
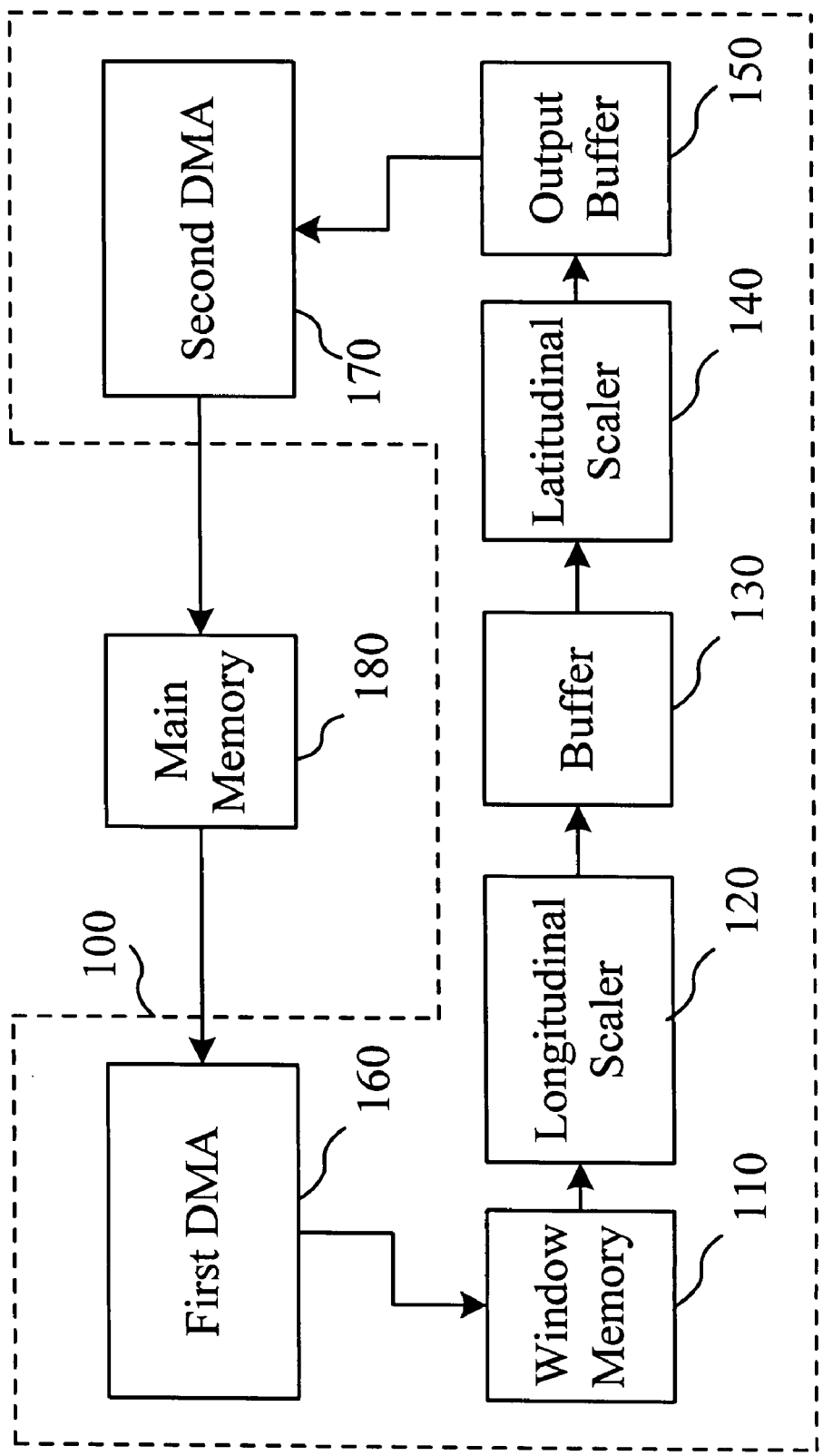
FIG. 1 is a block diagram of an image scaling system capable of saving memory in accordance with the invention.

FIG. 1 is a block diagram of an image scaling system 100 capable of saving memory in accordance with the invention. The image scaling system 100 can shrink and expand an image. The image consists of plural image lines. The image scaling system 100 includes a window memory 110, a longitudinal scaler 120, a buffer 130, a latitudinal scaler 140, an output buffer 150, a first direct memory access (DMA) 160 and a second DMA 170.

The window memory 110 receives and temporarily stores partial data of N image lines, where N is a positive integer. In this embodiment, N is preferred to be 5. The longitudinal scaler 120 is connected to the window memory 110 in order to perform a longitudinal scaling operation on the partial data of the N image lines to thereby produce partial data of a longitudinal image line. The buffer 130 is connected to the longitudinal scaler 120 in order to receive and temporarily store the partial data of the longitudinal image line. The latitudinal scaler 140 is connected to the buffer 130 in order to perform a latitudinal scaling operation on the partial data of the longitudinal image line to thereby produce scaling-part data of a latitudinal image line.

The output buffer 150 is connected to the latitudinal scaler 140 in order to temporarily store the scaling-part data of the latitudinal image line. A scaling image is stored in a main memory 180. The first DMA 160 is connected to the main memory 180 in order to read the partial data of the N image lines from the main memory 180 and write the read data to the window memory 110.

The second DMA 170 is connected to the main memory 180 and the output buffer 150 in order to read the scaling-part data of the latitudinal image line from the output buffer 150 and send the read data to the main memory 180 for further use.

For performing the latitudinal and longitudinal image shrinkage, the longitudinal scaler 120 and the latitudinal scaler 140 use a window average method to proceed a shrinking operation. For performing the latitudinal and longitudinal image expansion, the longitudinal scaler 120 and the latitudinal scaler 140 use a bi-linear interpolation average method to proceed an expanding operation. The longitudinal image scaling is independent to the latitudinal image scaling. Namely, it is able to perform a longitudinal image expansion and a latitudinal image shrinkage, or perform a longitudinal image shrinkage and a latitudinal image expansion.

Figure 2:
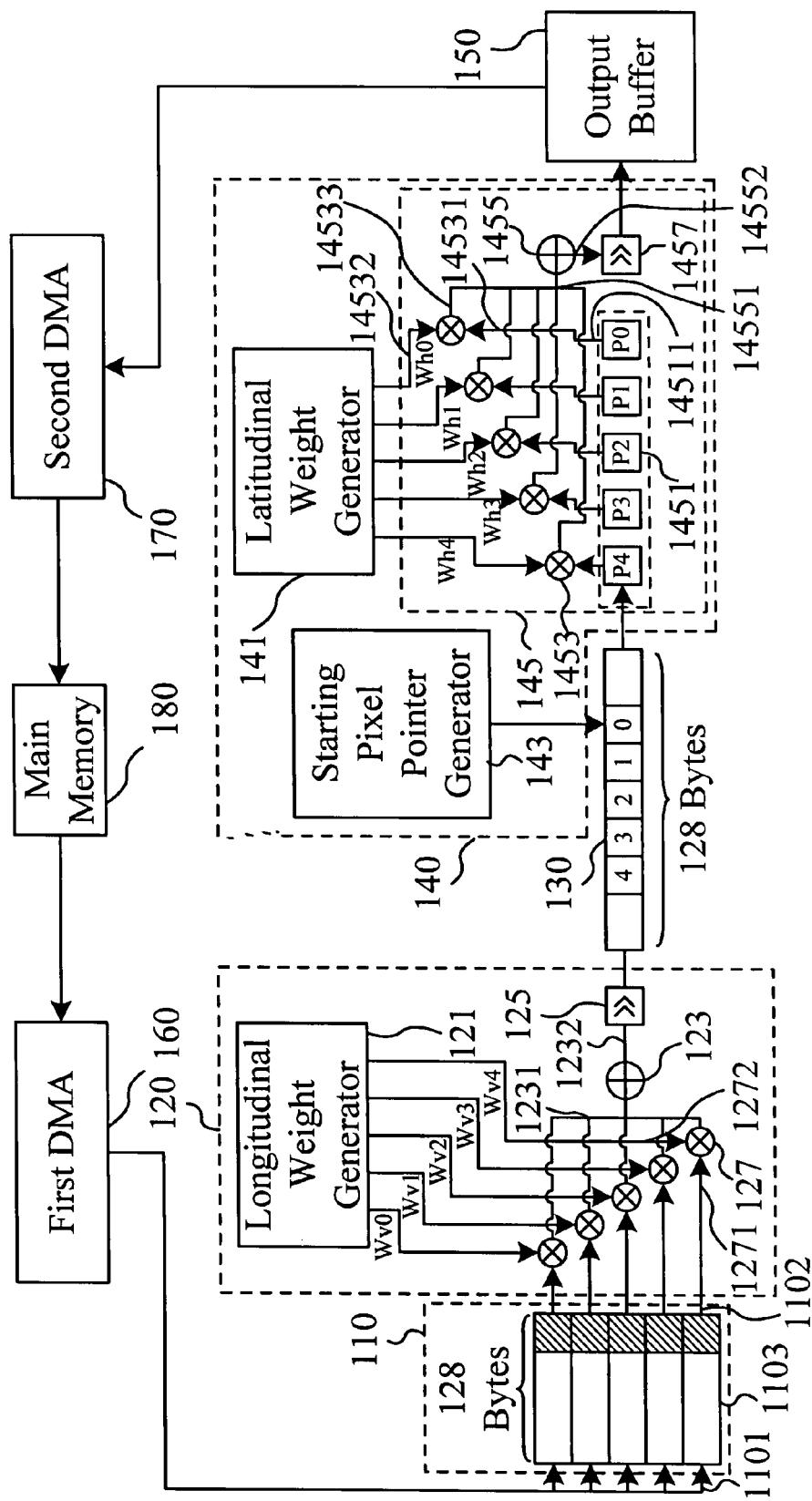
FIG. 2 is a circuit diagram of an image scaling system capable of saving memory in accordance with the invention.

FIG. 2 is a circuit diagram of an image scaling system capable of saving memory in accordance with the invention. As shown in FIG. 2, the buffer 130 is a FIFO. The window memory 110 has five input terminals 1101, five output terminals 1102, and a temporary storage 1103. The window memory 110 can receive the partial data of image lines sent by the first DMA 160 through the five input terminals 1101. The window memory 110 of the invention stores partial pixel values of an image data line, but it stores all pixel values of an image data line in the prior art. Therefore, the invention does not change the temporary storage of the window memory 110 due to the increase of the required image width, as shown in the prior art.

The longitudinal scaler 120 includes a longitudinal weight generator 121, N multipliers 127, a first adder 123 and a first shifter 125. The longitudinal weight generator 121 generates N longitudinal weights (Wv0, Wv1, Wv2, Wv3, Wv4) on image scaling.

Each of the multipliers 127 has a first input terminal 1271 connected to a respective output terminal 1102 of the window memory 110, and a second input terminal 1272 connected to the longitudinal weight generator 121, thereby receiving one of the N longitudinal weights (Wv0, Wv1, Wv2, Wv3, Wv4), respectively, and performing a multiplication on the partial data of the N image lines.

The first adder 123 has N input terminals 1231 connected to the respective output terminals 1273 of the N multipliers 127 in order to perform an addition on the output data of the N multipliers 127. The first shifter 125 is connected to the output terminal 1232 of the first adder 123 in order to shift the output data of the first adder 123. After the shifting operation, the longitudinally processed pixel value is obtained. The aforementioned steps are applied to each pixel in the window memory 110, and accordingly the longitudinally processed partial data of the N image lines is obtained. In this embodiment, the partial data contains 128 pixels.

The N longitudinal weights (Wv0, Wv1, Wv2, Wv3, Wv4) generated by the longitudinal weight generator 121 meet with $Wv0+Wv1+Wv2+Wv3+Wv4=2^K$, where K is a positive integer. Therefore, the first shifter 125 can perform a division by using a right-shift operation.

The latitudinal scaler 140 includes a latitudinal weight generator 141, a starting pixel pointer generator 143 and a latitudinal scaling engine 145. The latitudinal weight generator 141 generates M latitudinal weights on image scaling. In this embodiment, M=5, i.e., Wh0, Wh1, Wh2, Wh3, Wh4.

The starting pixel pointer generator 143 is connected to the buffer 130 in order to generate a pointer to indicate an accessing position to the buffer 130. The latitudinal scaling engine 145 is connected to the buffer 130 and the latitudinal weight generator 141 in order to read the data of M pixels from the buffer 130 and the corresponding M latitudinal weights from the latitudinal weight generator 141, thereby performing the latitudinal scaling on the M pixels.

The latitudinal scaling engine 145 includes M registers 1451, M multipliers 1453, a second adder 1455 and a second shifter 1457. The M registers 1451 are connected to the buffer 130 in order to temporarily store the data of M pixels read from the buffer 130. Each of the multipliers 1453 has a first input terminal 14531 connected to one of the output terminals 14511 of the M registers 1451 and a second input terminal 14532 connected to the latitudinal weight generator 141, thereby receiving one of the M latitudinal weights generated by the latitudinal weight generator 141 and performing a multiplication on the M pixels.

The second adder 1455 has M input terminals 14551 connected to the respective output terminals 14533 of the M multipliers 1453 in order to perform an addition on the output data of the M multipliers 1453. The second shifter 1457 is connected to the output terminal 14552 of the second adder 1455 in order to shift the output data of the second adder 1455.

FIG. 3 is a schematic diagram of pseudo codes for generating M latitudinal weights by the latitudinal weight generator 141 on image expansion in accordance with the invention.

FIG. 4 is a schematic diagram of pseudo codes for generating M latitudinal weights by the latitudinal weight generator 141 on image shrinkage in accordance with the invention. The pseudo codes of FIG. 3 and FIG. 4 can be implemented by a hardware description language (HDL), such as Verilog or VHDL.

Figure 5:
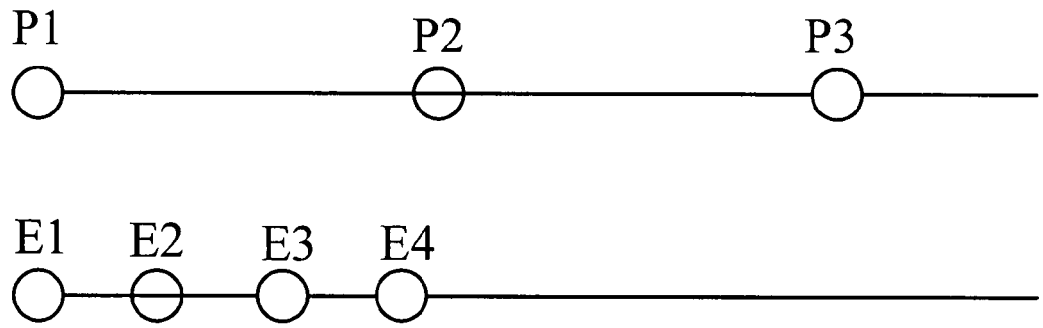
FIG. 5 a schematic graph of using a bi-linear interpolation average to perform an image expanding operation in accordance with the invention.

On the image expansion, the latitudinal scaler 140 uses the bi-linear interpolation average method to proceed the expanding operation. FIG. 5 a schematic graph of using the bi-linear interpolation average method to perform an image expanding operation with a scaling factor of 2.1. The expanding operation first sets a maximum weight max_weight, and in this case max_weight=256 ($2^8$). Next, an expanding parameter expand_para is calculated by multiplying the maximum weight max_weight by an input proportion first and then dividing the result by an output proportion. In this embodiment, the input proportion is one, and the output proportion is 2.1. Accordingly, expand_para=121 is obtained.

From the pseudo codes shown in FIG. 3, the M latitudinal weights Wh0, Wh1, Wh2, Wh3, and Wh4 are found in calculation. Referring to FIG. 3 and FIG. 5, when the first loop in the program is executed, an accumulator has a value Acc=0<256, and a linear interpolation is applied to the pixels P1 and P2 to thereby obtain the weight Wh0=256 for the pixel P1 and the weight Wh1=0 for the pixel P2. At this moment, the first loop comes to an end, and the other weights Wh2=Wh3=Wh4=0. Therefore, it is obtained:

$$E1=(P1\times256+P2\times0+P3\times0+P4\times0+P5\times0)>>2^8.$$

Similarly, when the second loop is executed with Acc=0+121<256, the weight Wh0=(256−121) for the pixel P1 and the weight Wh1=121 for the pixel P2 are obtained by applying the linear interpolation to the pixels P1 and P2. At this moment, the second loop comes to an end, and the other weights Wh2=Wh3=Wh4=0. Therefore, it is obtained:

$$E2=(P1\times135+P2\times121+P3\times0+P4\times0+P\times0)>>2^8.$$

Similarly, when the third loop is executed with Acc=121+121<256, the weight Wh0=(256−242) for the pixel P1 and the weight Wh1=242 for the pixel P2 are obtained by applying the linear interpolation to the pixels P1 and P2. At this moment, the third loop comes to an end, and the other weights Wh2=Wh3=Wh4=0. Therefore, it is obtained:

$$E3=(P1\times14+P2\times242+P3\times0+P4\times0+P5\times0)>>2^8.$$

Similarly, when the fourth loop is executed, we have Acc=242+121>256. In this case, Acc=363−256=107 is calculated. Accordingly, the weight Wh0=(256−107) for the pixel P2 and the weight Wh1=107 for the pixel P3 are obtained by applying the linear interpolation to the pixels P2 and P3. At this moment, the fourth loop comes to an end, and the other weights Wh2=Wh3=Wh4=0. Therefore, it is obtained:

$$E4=(P2\times149+P\times107+P4\times0+P5\times0+P6\times0)>>2^8.$$

The remaining pixels are processed by the same steps above and not repeated.

Figure 6:
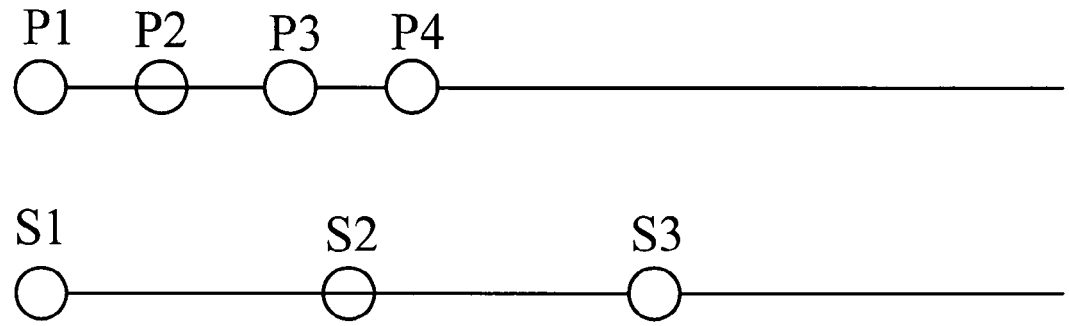
FIG. 6 a schematic graph of using a window average to perform an image shrinking operation in accordance with the invention.

On the image shrinkage, the latitudinal scaler 140 uses the window average to proceed the shrinking operation. FIG. 6 a schematic graph of using the window average to perform an image shrinking operation with a shrinking power of 2.6. The shrinking operation first sets a maximum weight max_weight, and in this case max_weight=256 ($2^8$). Next, a shrinking parameter shrink_norm is calculated by multiplying the maximum weight max_weight by an output proportion first and then dividing the result by an input proportion. In this embodiment, the input proportion is 2.6, and the output proportion is one. Accordingly, it is obtained shrink_norm=98.

From the pseudo codes shown in FIG. 4, the M latitudinal weights Wh0, Wh1, Wh2, Wh3, and Wh4 are found in calculation. As shown in FIG. 4, when the first loop in the program is executed, the accumulator has a value Acc=258−98=158>0, such that the pixel P1 has the weight Wh0=98 and the weight Wh1 for the pixel P2 is proceeded. Because Acc=158−98=60>0, the pixel P2 has the weight Wh1=98, and the weight Wh2 for the pixel P3 is proceeded. Because Acc=60-98<=0, the pixel P3 has the weight Wh2=60, and the first loop comes to and end, i.e., the other weights Wh3=Wh4=0. Therefore, it is obtained:

$$S1=(P1\times98+P2\times98+P3\times60+P433\ 0+P5\times0)>>2^8.$$

Similarly, when the second loop is executed, we have Acc=256−(98−60)=218>0, such that the pixel P3 has the weight Wh0=38 and the weight Wh1 for the pixel P4 is proceeded. Because Acc=218−98=120>0, the pixel P4 has the weight Wh1=98, and the weight Wh2 for the pixel P5 is proceeded. Because Acc=120−98=22>0, the pixel P5 has the weight Wh2=98, and the weight Wh3 for the pixel P6 is proceeded. Because Acc=22-98<0, the pixel P6 has the weight Wh3=22, and the first loop comes to an end, i.e., the weight Wh4=0. Therefore, it is obtained:

$$S2=[P3\times(98-60)+P4\times98+P5\times98+P6\times22+P7\times0]>>2^8.$$

The remaining pixels are processed by the same steps as described above and thus a detailed description is deemed unnecessary.

The longitudinal scaler 120 uses the window average method to proceed the image shrinking operation and the bi-linear interpolation average method to proceed the image expanding operation, which are identical to those used by the latitudinal scaler 140. Accordingly, the pseudo codes shown in FIGS. 3 and 4 can be employed to implement the hardware circuit of the longitudinal scaler 120 by those skilled in the art.

Because the longitudinal weights for the N image lines have no change on scaling an image line, they can be calculated in advance and written in a longitudinal weight register to replace the longitudinal weight generator 121.

Figure 7:
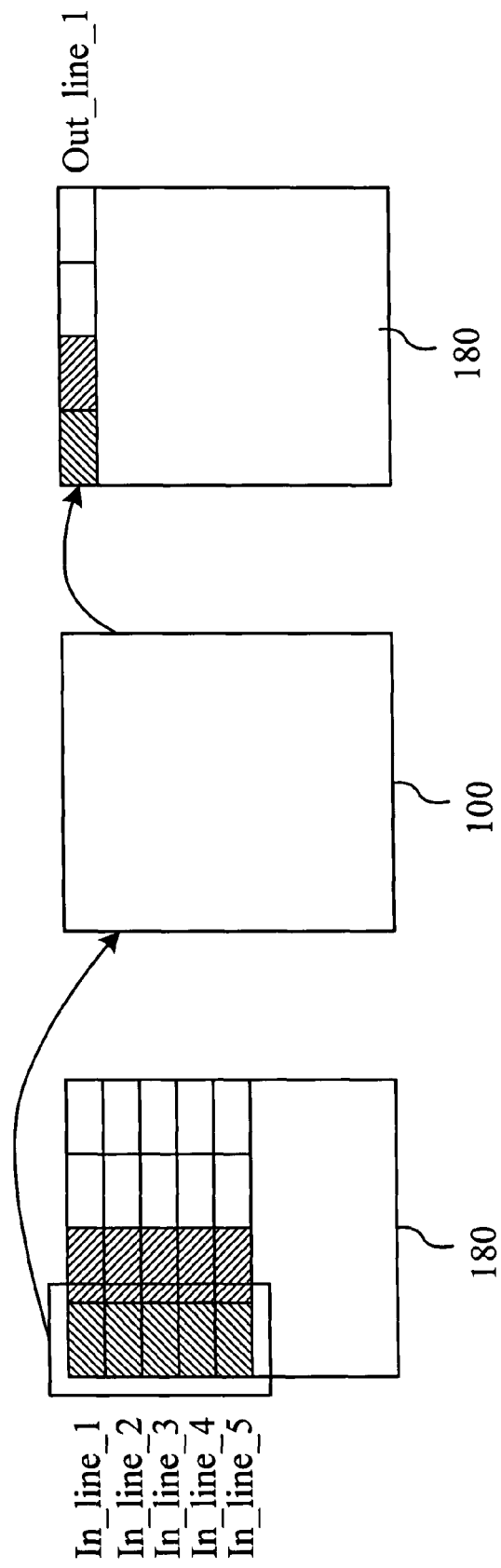
FIG. 7 a schematic diagram of an operation of an image scaling system capable of saving memory in accordance with the invention.

FIG. 7 a schematic diagram of an operation of the image scaling system 100 capable of saving memory in accordance with the invention. When the image is longitudinally and latitudinally shrunk, the image scaling system 100 uses the first DMA 160 to read the partial data In_line_1 to In_line_5 of five image lines from the main memory 180, and performs the longitudinal shrinking operation and then the latitudinal shrinking operation to thereby obtain the shrinking-part data Out_line_1 of the latitudinal image line. Next, the image scaling system 100 uses the second DMA 170 to store the shrinking-part data Out_line_1 of the latitudinal image line in the main memory 180.

When the image is longitudinally and latitudinally expanded, the image scaling system 100 uses the first DMA 160 to read the partial data In_line_1 to In_line_2 of two image lines from the main memory 180, and performs the longitudinal expanding operation and then the latitudinal expanding operation to thereby obtain the expanding-part data Out_line_1 of the latitudinal image line. Next, the image scaling system 100 uses the second DMA 170 to store the expanding-part data Out_line_1 of the latitudinal image line in the main memory 180.

Figure 8:
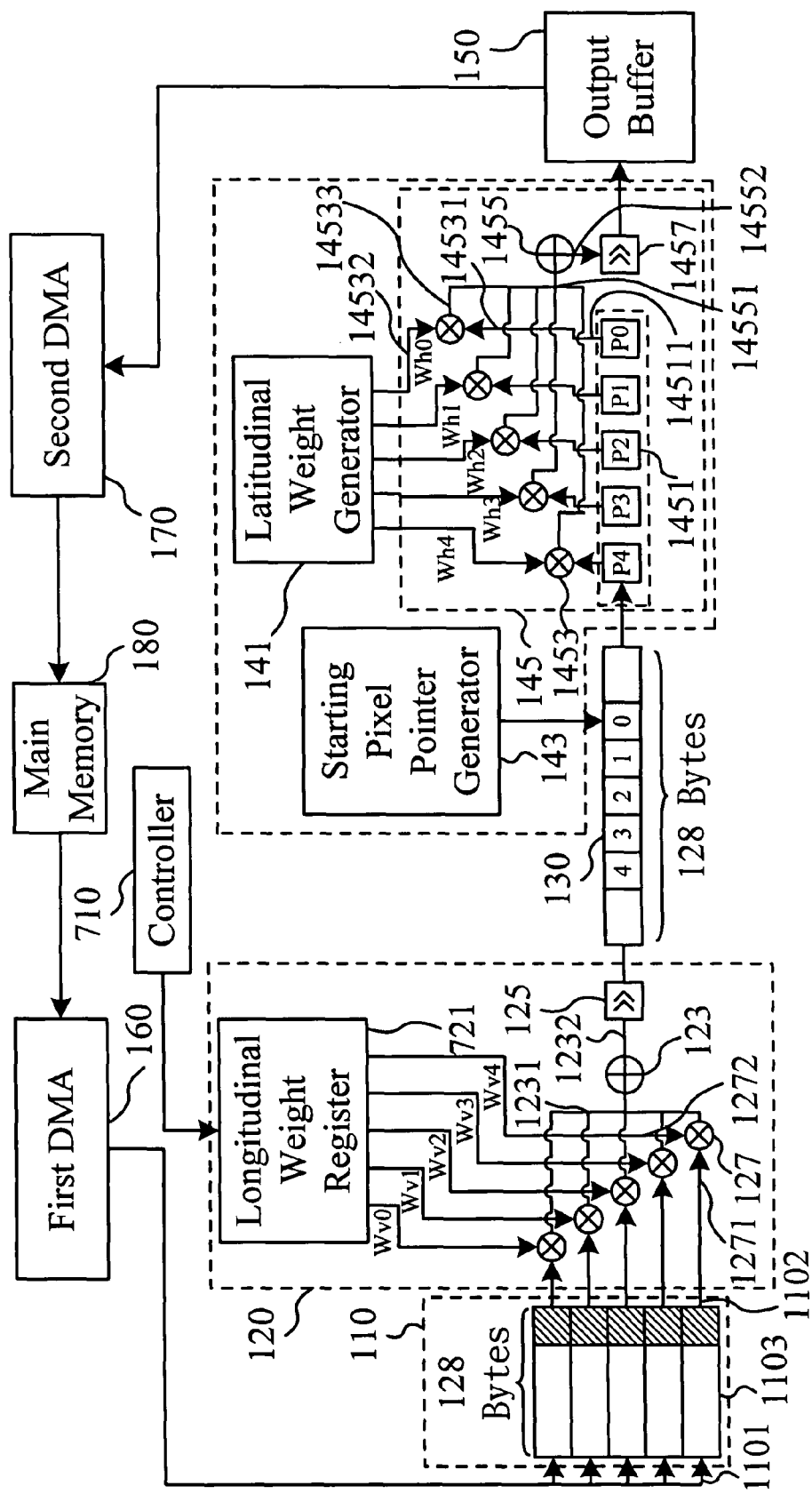
FIG. 8 is a circuit diagram of another embodiment in accordance with the invention.

FIG. 8 is a circuit diagram of another embodiment in accordance with the invention. As shown in FIG. 8, this embodiment uses a controller 710 to compute the longitudinal weights (Wv0, Wv1, Wv2, Wv3, Wv4) of the N image lines, and replaces the longitudinal scaler 120 with a longitudinal weight register 721. The controller 710 performs an initialization and associated settings of the first DMA 160 and the second DMA 170, and writes the longitudinal weights (Wv0, Wv1, Wv2, Wv3, Wv4) of the N image lines to the longitudinal weight register 721.

Figure 9:
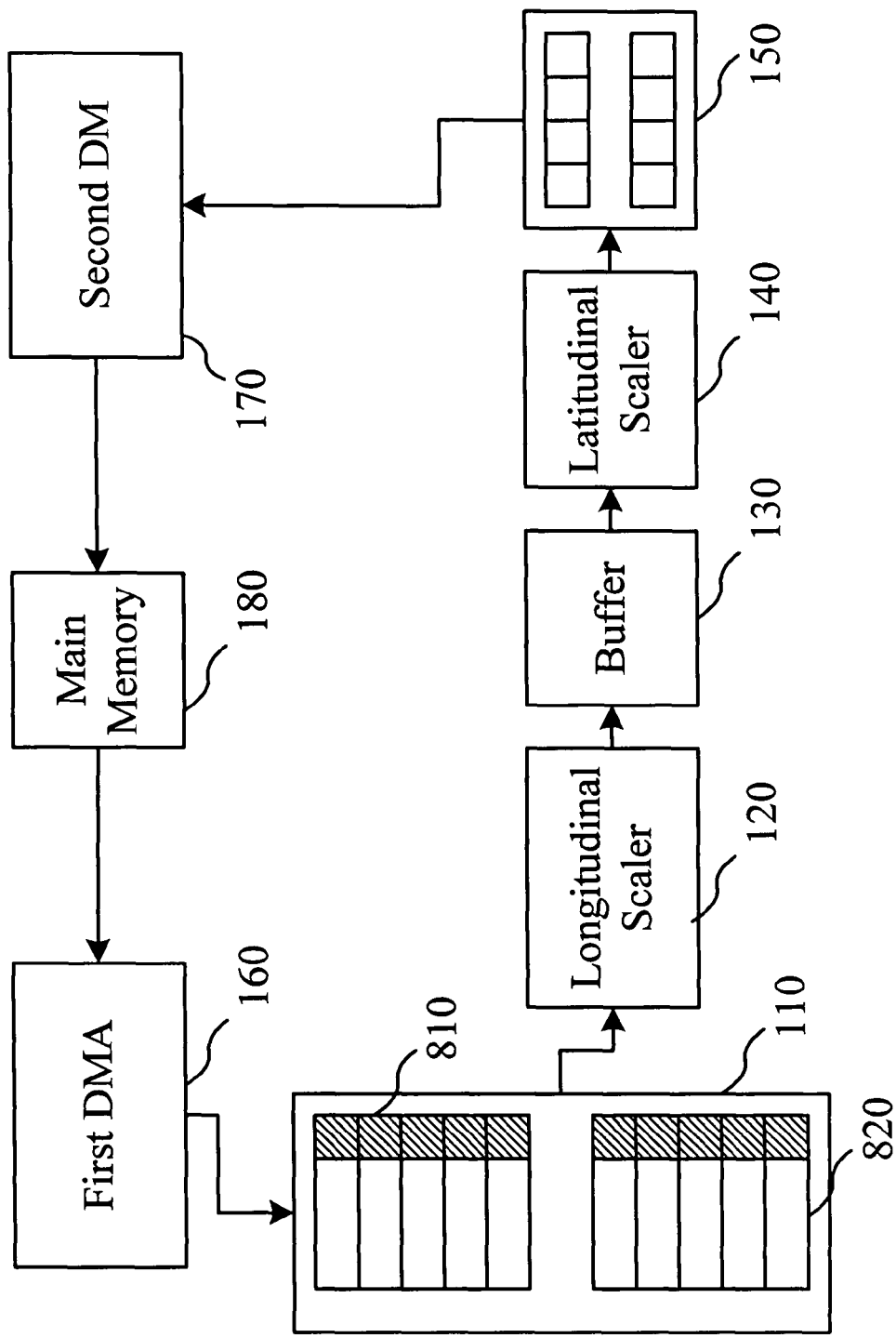
FIG. 9 is a circuit diagram of a further embodiment in accordance with the invention.

FIG. 9 is a circuit diagram of a further embodiment in accordance with the invention. In FIG. 9, the window memory 110 is a ping-pong window memory including a first ping-pong buffer 810 and a second ping-pong buffer 820, and the output buffer 150 is a ping-pong buffer. When the first ping-pong buffer 810 is full of data, its output is directed to the longitudinal scaler 120. When the first ping-pong buffer 810 is empty of data and the second ping-pong buffer 820 is full of data, the output of the second ping-pong buffer 820 is directed to the longitudinal scaler 120. Accordingly, the system throughput is increased.

In view of the foregoing, it is known that the invention applies the window memory in image expanding and shrinking, which can meet the requirements of reducing the image processing time and memory size. The invention replaces the line buffer with the window memory to store image data to thereby reduce the required memory. In addition, the size of the window memory is optimized in accordance with the DMA bandwidth, thereby minimizing the required window memory and reducing the hardware cost.

Furthermore, the invention can write a window-sized input image to the window memory 110 by controlling the location of data read by the DMA. The window-sized input image is processed by the longitudinal expanding or shrinking processor and the latitudinal expanding or shrinking processor, and real-time output to the back-end image processing (such as image compression).

In addition, on performing the image expanding and shrinking operation, the longitudinal scaler 120 commonly uses the window memory 110 to thereby further reduce the required memory. For a 2D image data processing, it is not required to perform an output only when the entire image line is processed completely. Namely, when a plurality of image data is processed completely, its output is performed through the second DMA 170. Accordingly, the real-time output requirement is achieved.

Although the present invention has been explained in relation to its preferred embodiment, it is to be understood that many other possible modifications and variations can be made without departing from the spirit and scope of the invention as hereinafter claimed.

What is claimed is:

1. An image scaling system capable of saving memory, provided for shrinking and expanding an image consisting of plural image lines, the system comprising:
   a window memory, which receives and temporarily stores partial data of N image lines, where N is a positive integer;
   a first direct memory access (DMA), which is coupled between a main memory and the window memory in order to read the partial data of the N image lines from the main memory and write the partial data of the N image lines to the window memory;
   a longitudinal scaler, which is connected to the window memory in order to perform a longitudinal scaling operation on the partial data of the N image lines to thereby produce partial data of a longitudinal image line;
   a buffer, which is connected to the longitudinal scaler in order to receive and temporarily store the partial data of the longitudinal image line;
   a latitudinal scaler, which is connected to the buffer in order to perform a latitudinal scaling operation on the partial data of the longitudinal image line to thereby produce scaling-part data of a latitudinal image line;
   an output buffer, which is connected to the latitudinal scaler in order to store the scaling-part data of the latitudinal image line; and
   a second DMA, which is coupled between the main memory and the output buffer in order to read the scaling-part data of the latitudinal image line from the output buffer and write the scaling-part data of the latitudinal image line to the main memory;
   wherein the longitudinal scaler and the latitudinal scaler use a window average to perform a shrinking operation for shrinking the image, and a bi-linear interpolation average to perform an expanding operation for expanding the image.

2. The system as claimed in claim 1, wherein the window memory has N output terminals.

3. The system as claimed in claim 2, wherein the longitudinal scaler comprises:
   a longitudinal weight generator, which generates N longitudinal weights on image scaling, and
   N multipliers, each said multiplier having a first input terminal connected to one of the N output terminals of the window memory and a second input terminal connected to the longitudinal weight generator, thereby respectively receiving one of the N longitudinal weights generated by the longitudinal weight generator and performing a multiplication on the partial data of the N image lines.

4. The system as claimed in claim 3, wherein the longitudinal scaler further comprises a first adder, which has N input terminals connected to output terminals of the N multipliers respectively in order to perform an addition on outputs of the N multipliers.

5. The system as claimed in claim 4, wherein the longitudinal scaler further comprises a first shifter, which is connected to an output terminal of the first adder, thereby shifting an output of the first adder and generating the partial data of the longitudinal image line.

6. The system as claimed in claim 5, wherein the latitudinal scaler comprises a latitudinal weight generator, which generates M latitudinal weights on image scaling, where M is a positive integer.

7. The system as claimed in claim 6, wherein the latitudinal scaler further comprises:
   a starting pixel pointer generator, which is connected to the buffer in order to generate a pointer to indicate an accessing position to the buffer, and
   a latitudinal scaling engine, which is connected to the buffer and the latitudinal weight generator in order to read data of M pixels from the buffer and the M latitudinal weights from the latitudinal weight generator, thereby performing a latitudinal scaling operation on the M pixels.

8. The system as claimed in claim 7, wherein the latitudinal scaling engine comprises:
   M registers, which are connected to the buffer in order to temporarily store the data of the M pixels read from the buffer; and
   M multipliers, each multiplier having a first input terminal connected to one of output terminals of the M registers and a second input terminal connected to the latitudinal weight generator, thereby respectively receiving one of the M latitudinal weights generated by the latitudinal weight generator and performing a multiplication on the M pixels.

9. The system as claimed in claim 8, wherein the latitudinal scaling engine further comprises a second adder, which has M input terminals connected to output terminals of the M multipliers respectively in order to perform an addition on outputs of the M multipliers.

10. The system as claimed in claim 9, wherein the latitudinal scaling engine further comprises a second shifter, which is connected to an output terminal of the second adder, thereby performing a shifting operation on an output of the second adder.

11. An image scaling system capable of saving memory, provided for shrinking and expanding an image consisting of plural image lines, the system comprising:
   a window memory, which receives and temporarily stores partial data of N image lines, where N is a positive integer;
   a first direct memory access (DMA), which is coupled between a main memory and the window memory in order to read the partial data of the N image lines from the main memory and write the partial data of the N image lines to the window memory;
   a longitudinal scaler, which is connected to the window memory in order to perform a longitudinal scaling operation on the partial data of the N image lines to thereby produce partial data of a longitudinal image line;
   a buffer, which is connected to the longitudinal scaler in order to receive and temporarily store the partial data of the longitudinal image line;
   a latitudinal scaler, which is connected to the buffer in order to perform a latitudinal scaling operation on the partial data of the longitudinal image line to thereby produce scaling-part data of a latitudinal image line;
   an output buffer, which is connected to the latitudinal scaler in order to temporarily store the scaling-part data of the latitudinal image line;
   a second DMA, which is coupled between the main memory and the output buffer in order to read the scaling-part data of the latitudinal image line from the output buffer and write the scaling-part data of the latitudinal image line to the main memory; and
   a controller, which is connected to the longitudinal scaler and the latitudinal scaler in order to perform an initialization and associated settings on the longitudinal scaler and the latitudinal scaler, generate N longitudinal weights respectively for the N image lines, and write the N longitudinal weights to the longitudinal scaler;
   wherein the longitudinal scaler and the latitudinal scaler use a window average to perform a shrinking operation for shrinking the image and a bi-linear interpolation average to perform an expanding operation for expanding the image.

12. The system as claimed in claim 11, wherein the window memory has N output terminals.

13. The system as claimed in claim 12, wherein the longitudinal scaler comprises:
   a longitudinal weight register, which is connected to the controller in order to store the N longitudinal weights generated by the controller on image scaling,
   N multipliers, each said multiplier having a first input terminal connected to one of the N output terminals of the window memory and a second input terminal connected to the longitudinal weight register, thereby respectively receiving one of the N longitudinal weights temporarily stored in the longitudinal weight register and performing a multiplication on the partial data of the N image lines,
   a first adder, which has N input terminals connected to output terminals of the N multipliers respectively in order to perform an addition on outputs of the N multipliers, and
   a first shifter, which is connected to an output terminal of the first adder, thereby shifting an output of the first adder and generating the partial data of the longitudinal image line.

14. The system as claimed in claim 13, wherein the latitudinal scaler comprises:
   a latitudinal weight generator, which generates M latitudinal weights on image scaling, where M is a positive integer,
   a starting pixel pointer generator, which is connected to the buffer in order to generate a pointer to indicate an accessing position to the buffer, and
   a latitudinal scaling engine, which is connected to the buffer and the latitudinal weight generator in order to read data of M pixels from the buffer and the M latitudinal weights from the latitudinal weight generator, thereby performing a latitudinal scaling operation on the M pixels.

15. The system as claimed in claim 14, wherein the latitudinal scaling engine comprises:
   M registers, which are connected to the buffer in order to temporarily store the data of the M pixels read from the buffer;
   M multipliers, each multiplier having a first input terminal connected to one of output terminals of the M registers and a second input terminal connected to the latitudinal weight generator, thereby respectively receiving one of the M latitudinal weights generated by the latitudinal weight generator and performing a multiplication on the M pixels,
   a second adder, which has M input terminals connected to output terminals of the M multipliers respectively in order to perform an addition on outputs of the M multipliers, and
   a second shifter, which is connected to an output terminal of the second adder, thereby performing a shifting operation on an output of the second adder.

* * * * *